Aug. 12, 1924.
H. K. HENNIGH
1,504,344
SAFETY DEVICE FOR VEHICLE DRIVERS
Filed June 9, 1922
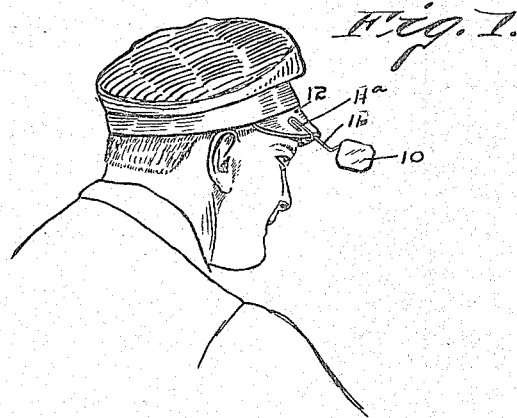
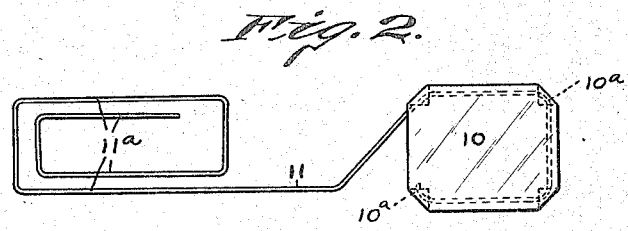
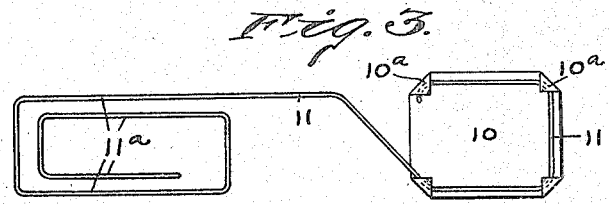
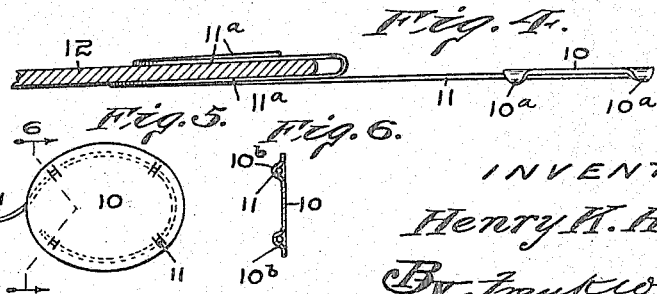
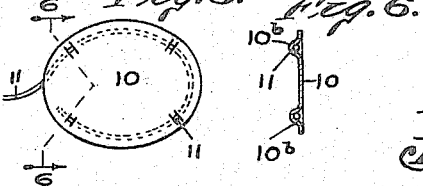
INVENTOR:
Henry H. Hennigh,
By Frank W. Woerner
ATTORNEY.

Patented Aug. 12, 1924.

1,504,344

UNITED STATES PATENT OFFICE.

HENRY K. HENNIGH, OF HENRY COUNTY, INDIANA.

SAFETY DEVICE FOR VEHICLE DRIVERS.

Application filed June 9, 1922. Serial No. 567,033.

*To all whom it may concern:*

Be it known that I, HENRY K. HENNIGH, a citizen of the United States, residing in the county of Henry and State of Indiana, have invented certain new and useful Improvements in Safety Devices for Vehicle Drivers, of which the following is a specification.

This invention relates to a safety mirror for use among drivers of vehicles, being particularly adapted for use among drivers of motorcycles, whereby this class of drivers may guard itself against accidents of vehicles coming from the rear; and one of the objects of the invention consists in the provision of a safety mirror of the above character which can readily be attached and detached from the brim of a driver's hat or peak of a cap.

A further object of the invention consists in the provision of a safety mirror with means which readily lends itself to the proper positioning of the mirror on the driver's hat or cap and relatively to the line of vision.

A still further object of the invention consists in the provision of means for safeguarding users of motorcycles, which is extremely simple in construction, economical to manufacture, and efficient in operation.

I accomplish the above objects of the invention, and such others as may appear from a perusal of the following description and claims, by means of the construction illustrated in the accompanying drawings, forming a part hereof, in which—

Figure 1 is a perspective view of my improved safety mirror in operative position on a user's cap. Fig. 2 is a front elevation of my invention, on a considerably enlarged scale. Fig. 3 is a rear view of the construction shown in Fig. 2. Fig. 4 is an edge view of the device, showing its method of attachment to the brim of a hat or peak of a cap. Fig. 5 is a modified construction of the connection between the mirror and its support. Fig. 6 is a sectional view on the plane 6—6 in Fig. 5.

Referring to the drawings, 10 represents the safety mirror which is preferably formed of a thin sheet metal plate having a highly polished surface, and the surface plane of the mirror may be made straight, concave or convex, as desired. The contour of the mirror may be rectangular, round, oval or oblong, as may be found expedient. Mirror 10 is preferably supported upon and connected to a thin slender wire 11, either by bending the corners 10$^a$ of the sheet over wire 11, as shown in Figs. 2 and 3, or by cutting and bending back a part of the metal sheet 10 to form loops 10$^b$ to extend over wire 11, as shown in Figs. 5 and 6. The free end of wire 11 may be bent in the form of a parallelogram as shown, or bent spirally, so that in either case the loops or coils 11$^a$ may be spread apart to make room for the brim or peak 12 of the wearer's hat or cap, the wire having sufficient resiliency to clamp or grip its support 12 and hold mirror 10 in an extended position, as clearly shown in Fig. 1.

Figs. 5 and 6 illustrate a modified form of fastener for securing mirror 10 to its support 11. In this instance, the metal sheet 10 may be cut along parallel lines at several places, the metal between the lines of cutting being bent backwards to form the loops 10$^b$ through the openings of which wire 11 extends.

With the preceding disclosure of the different embodiments of my invention as a guide it will be easy for those skilled in this art to design other forms—to meet particular requirements of use—which will present all of the functional and result attaining characteristics and advantages of my improved device, and as the present invention is so extremely simple in construction, in application and use, and its utility so obvious, an extended description thereof is deemed unnecessary.

Having thus fully described my said invention, what I desire to secure by Letters Patent, is—

1. A device of the character described comprising a substantially rectangular sheet of material having a reflecting surface, a support therefor comprising a single length of wire formed at one end into a resilient clamp and bent at the other end to lie against the other surface of the said sheet of material and to follow the periphery thereof, the corners of the sheet of material being bent reversely over the adjacent portions of wire for securing the wire to the sheet of material, substantially as set forth.

2. A safeguarding attachment for hats or caps comprising a sheet of material formed with a reflecting surface, a support therefor comprising a length of pliable material bent at one end to lie against the other surface and to follow the contour of the said sheet of material, portions of the sheet of material being distorted to engage and hold the support in position, the other end of the support being formed into clamping means to engage the hat or cap, substantially as set forth.

3. A safeguarding attachment for hats or caps comprising a sheet of metallic material polished on one face to form a reflecting surface, a wire support therefor having means at one end for attachment to the hat or cap and having its other end lying adjacent the unpolished surface of the said sheet of material, and means for securing the last said portions of the support to the sheet of material by distorting parts of the latter into engagement with the support, substantially as set forth.

In witness whereof, I, have hereunto set my hand and seal at New Castle, Indiana, this 6th day of June, A. D. one thousand nine hundred and twenty two.

HENRY K. HENNIGH. [L. S.]